(12) United States Patent
Stien (10) Patent No.: US 11,407,365 B2
(45) Date of Patent: Aug. 9, 2022

(54) TAILGATE AND TRUCKBED MAT, SYSTEMS AND METHODS

(71) Applicant: Karl Stien, Eau Claire, WI (US)

(72) Inventor: Karl Stien, Eau Claire, WI (US)

( * ) Notice: Subject to any disclaimer, the term of this patent is extended or adjusted under 35 U.S.C. 154(b) by 62 days.

(21) Appl. No.: 17/070,470

(22) Filed: Oct. 14, 2020

(65) Prior Publication Data
US 2021/0107416 A1    Apr. 15, 2021

Related U.S. Application Data

(60) Provisional application No. 62/915,198, filed on Oct. 15, 2019.

(51) Int. Cl.
*B60R 13/01* (2006.01)
*B60R 9/10* (2006.01)
*B62D 33/027* (2006.01)

(52) U.S. Cl.
CPC ............... *B60R 13/01* (2013.01); *B60R 9/10* (2013.01); *B62D 33/0273* (2013.01); *B60R 2013/016* (2013.01)

(58) Field of Classification Search
CPC .... B62D 33/0273; B62D 33/03; B60R 13/01; B60R 13/011; B60R 2013/016; B60R 9/10; B60P 7/0884
USPC ...................................................... 296/39.2
See application file for complete search history.

(56) References Cited

U.S. PATENT DOCUMENTS

| | | | | |
|---|---|---|---|---|
| 3,881,768 A * | 5/1975 | Nix | ......................... | B62D 33/02 D12/221 |
| 4,188,058 A * | 2/1980 | Resa | ....................... | B60R 13/01 296/39.2 |
| 4,279,439 A * | 7/1981 | Cantieri | .................... | B60R 13/01 105/423 |
| 4,802,705 A * | 2/1989 | Elwell | ..................... | B60R 13/01 29/428 |
| 4,960,301 A * | 10/1990 | Fry | ......................... | B60R 13/01 296/39.2 |
| 5,421,634 A * | 6/1995 | Hackett | .................... | B60R 13/01 296/183.1 |
| 5,695,235 A * | 12/1997 | Martindale | ............. | B60R 13/01 296/39.2 |
| 5,722,710 A * | 3/1998 | Falciani | .................. | B60R 13/01 296/39.1 |
| 6,131,983 A * | 10/2000 | Jackson | ................... | B60R 13/01 296/39.1 |
| 6,237,980 B1 * | 5/2001 | Miles | ...................... | B60R 13/01 296/39.2 |
| 6,247,742 B1 * | 6/2001 | Boudreaux | ........ | B62D 33/0273 296/57.1 |
| 6,303,197 B1 * | 10/2001 | Hodgetts | ............... | B60P 7/0892 428/53 |
| 7,448,662 B1 * | 11/2008 | Fisher | ................... | B60R 13/011 296/39.1 |

(Continued)

*Primary Examiner* — Gregory A Blankenship
(74) *Attorney, Agent, or Firm* — Anthony J. Bourget (57) ABSTRACT

A device, system and method for protecting a tailgate of a pickup truck while also protecting a bed of the pickup truck includes a flexible mat having perforations to allow water and debris to pass therethrough and configured to slide along the bed of the pickup truck toward the tailgate such that a portion of the flexible mat extends upward and over a top edge of the tailgate, allowing bicycles to be carried upon the pickup truck while the bicycles extend over the top edge of the tailgate.

15 Claims, 8 Drawing Sheets

(56) References Cited

U.S. PATENT DOCUMENTS

| | | | | |
|---|---|---|---|---|
| 8,061,761 B1* | 11/2011 | Sierra | G09F 21/048 | |
| | | | 296/136.01 | |
| 8,834,985 B2* | 9/2014 | Preisler | B32B 3/263 | |
| | | | 428/116 | |
| 9,701,225 B1* | 7/2017 | Hogan | A47C 4/52 | |
| 10,696,236 B1* | 6/2020 | Starkey | B60P 1/283 | |
| 10,723,283 B1* | 7/2020 | Bellini | B60R 5/041 | |
| 10,882,469 B1* | 1/2021 | Bacchus | B60R 13/01 | |
| 10,899,287 B1* | 1/2021 | Conley | B32B 5/18 | |
| 2002/0135202 A1* | 9/2002 | Rokahr | B62D 33/0273 | |
| | | | 296/57.1 | |
| 2007/0018475 A1* | 1/2007 | McGinnis | B60R 13/01 | |
| | | | 296/39.1 | |
| 2012/0068493 A1* | 3/2012 | Waterman | B60R 13/01 | |
| | | | 296/39.2 | |
| 2015/0158412 A1* | 6/2015 | Dodge, III | B60P 7/0884 | |
| | | | 410/156 | |
| 2016/0082898 A1* | 3/2016 | Prestella | B62D 65/024 | |
| | | | 29/428 | |
| 2016/0214522 A1* | 7/2016 | Marshall | B60R 13/013 | |
| 2016/0264038 A1* | 9/2016 | Parkes | B60P 7/0884 | |
| 2017/0144614 A1* | 5/2017 | DePalma | B60R 13/013 | |
| 2019/0270399 A1* | 9/2019 | Dodge, III | B60P 7/0884 | |
| 2021/0078647 A1* | 3/2021 | Dunford | B62D 33/0273 | |
| 2021/0107416 A1* | 4/2021 | Stien | B60R 13/01 | |
| 2022/0001808 A1* | 1/2022 | Low | B60J 11/06 | |

\* cited by examiner

TAILGATE AND TRUCKBED MAT, SYSTEMS AND METHODS

BACKGROUND OF THE INVENTION

1. Field of the Invention

The present invention relates generally to protection devices, including devices for protecting a bed and a tailgate of a truck.

2. Background Information

There are many varieties of bed liner devices for protecting the bed of a pickup truck. There are also devices for protecting a tailgate of a truck, and particularly devices for placement on a tailgate for purposes of receiving bicycles for transport. Some devices operate as a "bib" which strap onto a tailgate of a pickup truck to cover the top edge of the closed tailgate such that a bicycle or several bicycles may be at placed upon the truck to straddle the tailgate without harming the tailgate.

While these truck bed liners and tailgate protectors have benefits, there is room for improvement.

SUMMARY OF THE INVENTION

Applicant has recognized a need for a device which is universally fitted to a variety of types of pickup trucks and operates as both a bed liner and a tailgate protector, and particularly has recognized a long-felt need for a tailgate edge protector for transporting bicycles and which is conveniently available as a bed liner.

In one aspect the invention includes a device for protecting a tailgate of a pickup truck, the device having a flexible mat having multiple through holes and configured to fold over a top edge of the tailgate while also positioned upon a bed of the pickup truck. In aspects the mat is configured to cover substantially an entirety of a bed of a pickup truck and which may be slid outward and upward where a portion of the mat overlays a substantial portion of an upper edge of the tailgate of a pickup truck.

In a further aspect the invention includes a system including a bed of a pickup truck having a tailgate closing an opening to the bed and a flexible mat for protecting a top edge of the tailgate, the mat configured to res upon the bed while covering the top edge of the tailgate. In aspects the mat includes perforations.

In further aspects the invention includes a method of protecting a closed tailgate of a pickup truck having a bed liner mat positioned upon a bed of the truck, the method including positioning at least a portion of the bed liner mat over a top edge of the tailgate while a further portion of the bed liner mat remains positioned upon the bed of the pickup truck. In further aspects the method includes positioning a bicycle upon the pickup truck such that at last a portion of the bicycle rests upon the bed liner positioned on the bed of the truck while at least a further portion of the bicycle extends over at least a portion of the bed liner mat positioned over the top edge of the tailgate. In aspects, the bed liner is a flexible sheet containing rubber and has multiple through holes.

The above abbreviated summary of the present invention is not intended to describe each illustrated embodiment, aspect, or every implementation or object of the present invention. The figures and detailed description that follow more particularly exemplify these and other embodiments and further aspects of the invention. Other features and advantages of the invention will be apparent from the following description, the accompanying drawings and the appended claims.

BRIEF DESCRIPTION OF THE DRAWINGS

The invention may be more completely understood in consideration of the following description of various embodiments of the invention in connection with the accompanying drawings, in which.

While the invention is amenable to various modifications and alternative forms, specifics thereof have been shown by way of example in the drawings and will be described in detail. It should be understood, however, that the intention is not necessarily to limit the invention to the particular embodiments described. The intention is to cover preferred embodiments, modifications, equivalents, and alternatives falling within the spirit and scope of the invention and as defined by the appended claims.

DETAILED DESCRIPTION OF THE INVENTION

The subject inventive devices, systems and methods may take on numerous physical and method embodiments within the spirit of the invention and only preferred embodiments have been described in detail below, which are not meant to limit the scope and/or spirit of the invention.

The present invention serves multiple purposes, including protecting both the bed and the tailgate of a pickup truck, while also protecting bicycles which are placed on the bed and tailgate of the truck for transport. It is desirable to transport bicycles by placing a bike so that an area between the bike frame and front forks is positioned over the tailgate while the rear portion of the bike extends into or onto the bed of the pickup truck. The mat of the present invention is positioned or wrapped over the top edge of the tailgate to provide protection to both the pickup truck and the bikes which are placed or wedged at the top of the tailgate. The mat also lays upon the bed of the truck for protection of the bed. The mat also lays entirely flat on the bed of the truck when the mat is is removed from the tailgate portion of the truck. While the mat is positioned at the top edge of the tailgate, a portion of the mat still lays upon the bed of the truck. A sufficient amount of the mat is positioned within the truck so that the mat does not fall out of the truck bed area.

Figure 1:
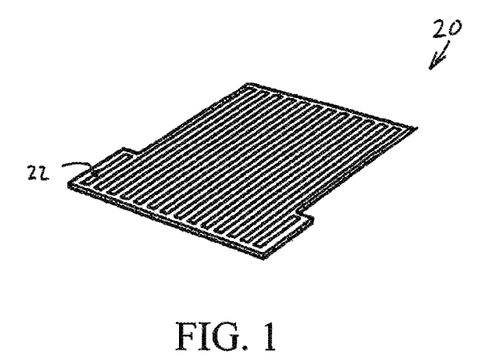
FIG. 1 is a perspective view of device in accordance with one aspect of the present invention.
Figure 2:
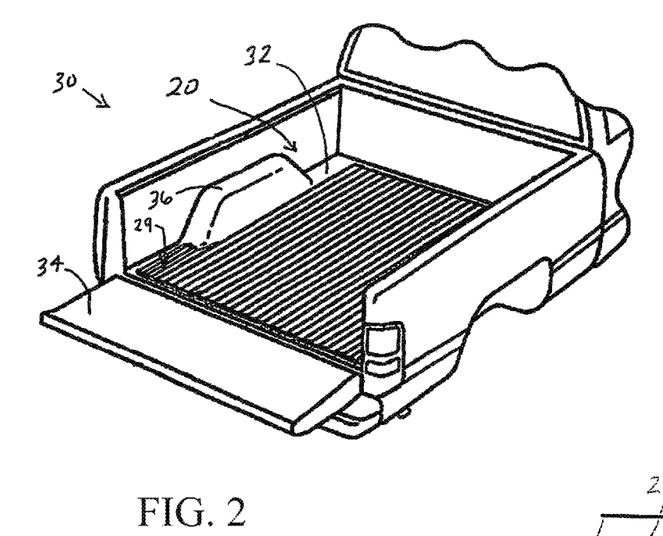
FIG. 2 is a perspective view of the device of FIG. 1 in a representative use mode.
Figure 3:
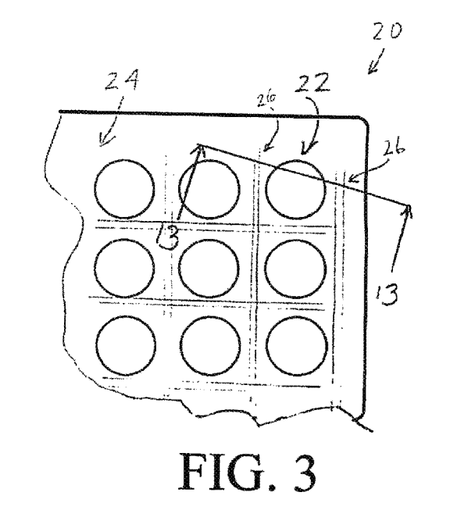
FIG. 3 is a partial bottom view of a device in accordance with a further aspect of the invention.

Referring to FIGS. 1-17, various device, system and method aspects of the invention are shown. FIG. 1 shows device 20 for protecting a tailgate 34 of a pickup truck 30. Device 20 also protects a bed 32 of the pickup truck 30. Device 20 is a flexible mat 20 made of rubber and/or plastic material and lays upon the bed 32 of the truck 30 in a standard mode. FIG. 2 shows mat 20 placed upon the bed 32 and where the tailgate 34 is in a down or open position. In this aspect, mat 20 includes slots or through holes 22 which pass through the thickness of the flexible mat 20. The through holes 22 allow water and debris to pass through the mat 20 to the bed 32 thus keeping articles placed on the mat 20 from sitting in water or getting dirty. FIG. 3 is a partial view showing an alternative mat 20 having circular through holes 22 and depicting a bottom side 24 of mat 20. Bottom side 24 in some aspects includes drainage channels 26 which allow for water drainage. Mat 20 provides a non-slip surface to help keep articles and equipment from sliding upon the bed 32. Mat 20 is provided in various styles and configurations, some of which are presented throughout the remainder of this description. Alternative styles and configurations of mat 20 are contemplated as addressed herein.

Figure 4:
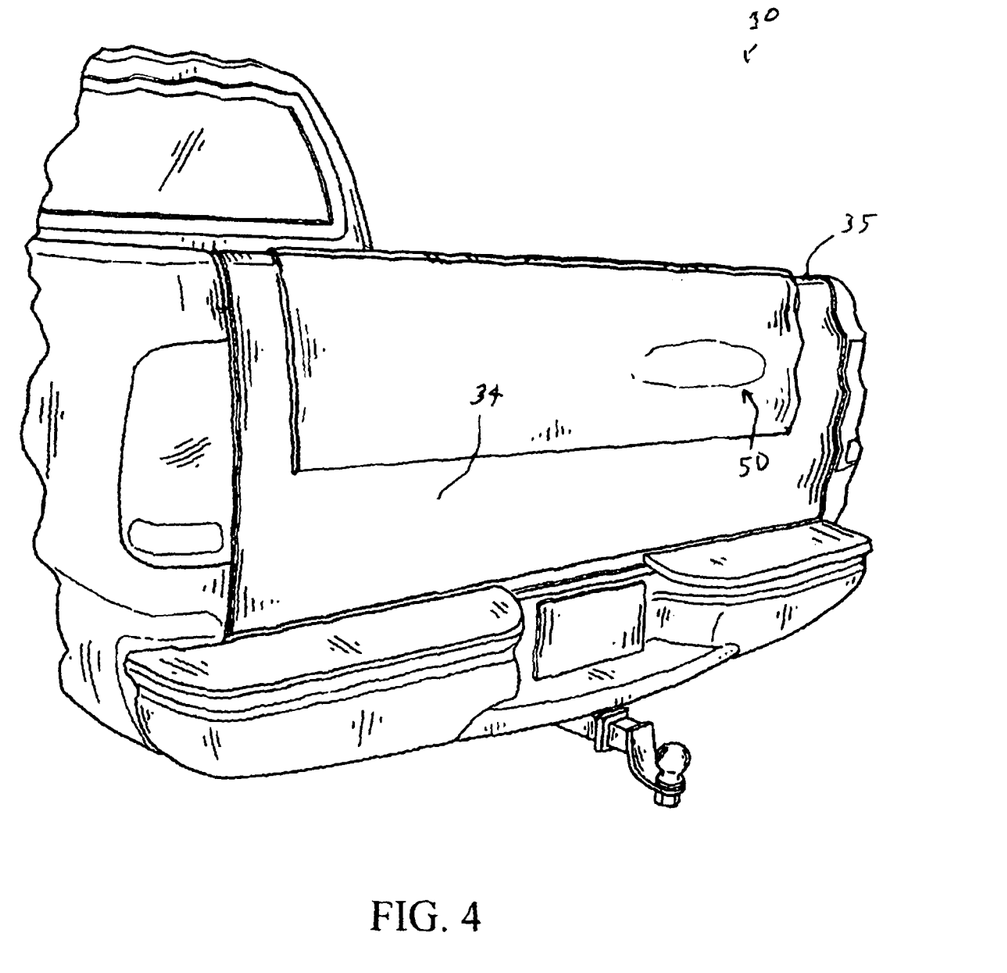
FIG. 4 is a partial perspective view of a device in accordance with a further aspect of the invention and in a representative use mode.
Figure 5:
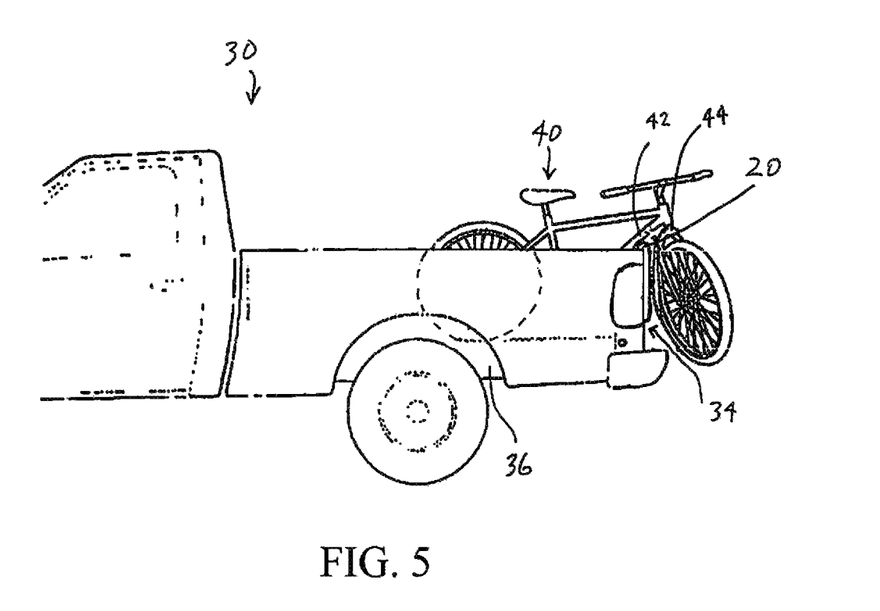
FIG. 5 is a side view of a device in accordance with the present invention and also in a use mode.

FIG. 4 is a perspective view showing one aspect of a mat 20 placed in-part over tailgate 34 of a pickup truck 30 in accordance with the invention. FIG. 5 is a side view of a pickup truck 30 with mat 20 positioned upon tailgate 34 and bicycle 40 placed upon the tailgate 34. A portion of bicycle 40 extends inward toward the bed 32 of the pickup truck 30 and in some aspects the bicycle 40 will rest upon the bed 30. Multiple bicycles 40 may be simultaneously positioned along the tailgate 34 and mat 20. The mat 20 protects the top edge 35 (and also the sides) of tailgate 34 from damage caused by the bike 40. While pickup 30 travels, the bicycles 40 will otherwise tend to bounce, causing the frame 42, forks, 44 or other components of the bicycle 40 to contact the tailgate 34. Providing mat 20 protects the tailgate 34 and the bicycles 40 from contact and damage.

Figure 6:
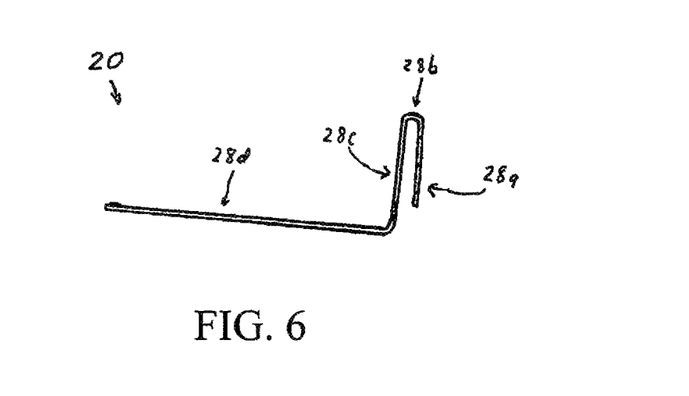
FIG. 6 is a side view of the device of FIG. 5.

FIG. 6 is a side view of mat 20 showing one aspect of the flexible nature of mat 20. In one aspect mat 20 has a thickness of between ⅛ inches and 1 inch. The mat 20 of FIG. 6 has a thickness of approximately ⅜ inches. In one aspect mat 20 has a generally homogenous flexibility, meaning the thickness and flexibility of the mat is generally uniform throughout the entirety of the mat 20. In other aspects, certain portions or areas of the mat 20 may be more flexible than other areas. Certain portions of the mat 20 may include more or less through holes 22 compared to other areas of the mat 20. The mat 20 of FIG. 6 has general uniform flexibility throughout. The mat 20 shown in FIG. 6 depicts one orientation of the mat 20 as to how it may be positioned about the tailgate 34 and bed 32. In one aspect, the mat 20 results in a curved structure as shown, with a first segment 28a hanging over the tailgate 34, a second segment 28b positioned over the top edge 35 of the tailgate 34, a third generally vertical segment 28c covering a portion of an inside of the tailgate 34, and a fourth generally horizontal segment 28d covering at least a portion of the bed 32. It may be appreciated that mat 20 is entirely flexible and may fold or roll similar to an area of carpet or blanket. While segment 28c and segment 28d form a general right angle as shown, there is no requirement for mat 20 to have such flexibility, and such segments may be oriented at different angles, or may provide a curve or sag between top edge 35 of tailgate 34 and bed 32. A top edge 35 of tailgate 34 has a thickness of about 1 to 3 inches, and in some cases a thickness of 3 to 6 inches. Mat 20 is flexible such that mat 20 will conform to the contour of top edge 35 and flex as needed to present a smooth or rounded upper segment 28b.

Figure 7:
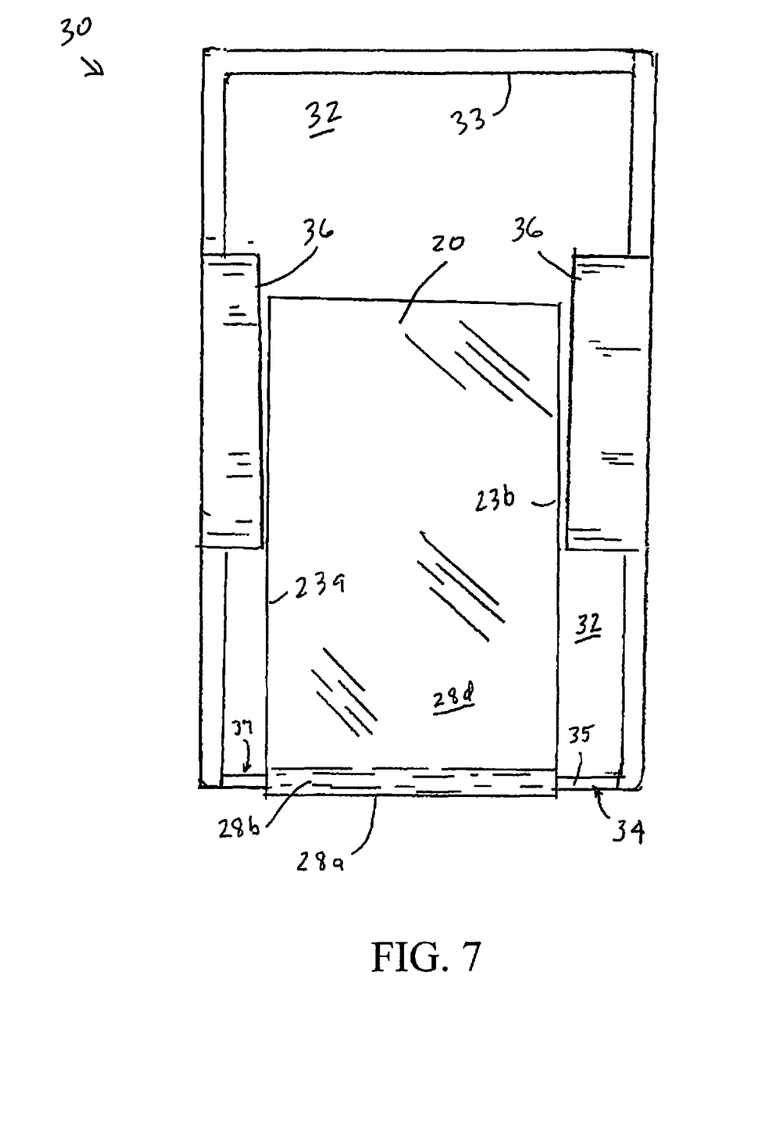
FIG. 7 is a top view of a device in accordance with a further aspect of the invention and in a representative use mode.

FIG. 7 is a top view of a mat 20 positioned on a bed 32 and over a tailgate 34 of a pickup truck 30. In this aspect, mat 20 has a generally rectangular perimeter and is sized to fit between opposing wheel wells 36 of truck 30. Mat 20 is pulled or slid outward so that segment 28 hangs outward of tailgate 34 while segment 28b is positioned over top edge 35 of the tailgate 34. In further aspects, mat 20 will have a width which fits loosely between wheel wells 36. In one aspect mat 20 is configured to have an outside perimeter such that mat 20 operates as a bed liner for the truck 30 where the outside perimeter edges of mat 20 are positioned in close proximity to the back wall 33, tailgate 34 and wheel wells 36 (such as within about 1 to 2 inches of such portions of the truck). In further aspects, mat 20 will have a width which fits snugly or friction fits between wheel wells 36 and/or other portions of the truck. The mat 20 of FIG. 7 may include optional through holes 22. In further aspects, mat 20 of FIG. 7 may have holes of a variety of different patterns as desired. In one aspect mat 20 has a length corresponding to the length of the bed 32 of truck 30. In one aspect, mat 20 will fit loosely between tailgate 34 and a back wall 33 of pickup truck 30. In further aspects, mat 20 has a length such that it has a tight fit between tailgate 34 and back wall 33. When mat 20 is pulled outward so that a portion of mat 20 lays over top edge 35 of tailgate 34, a portion of bed 32 toward back wall 33 will be exposed. Mat 20 may be slid toward back wall 33 when there is no longer a need to cover tailgate 34. As shown in FIG. 7, portions 37 of the top edge 35 are exposed at the outer edges. This exposed portions 37 might be damaged if a bicycle 40 is positioned at such exposed portion or if a bicycle were to shift during transport.

Figure 8:
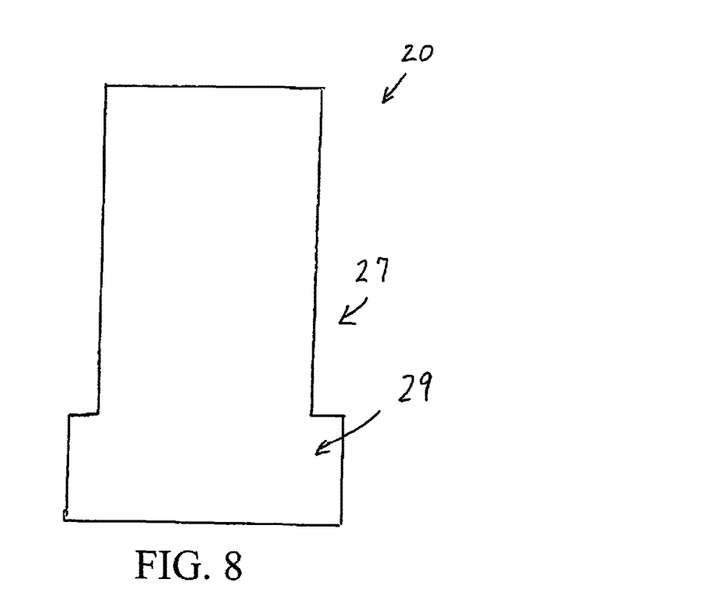
FIG. 8 is a top view of a device in accordance with a further aspect of the present invention.

FIG. 8 is a top view of a mat 20 having a generally rectangular neck/body segment 27. The neck/body segment 27 is configured to lay between opposing wheel wells 36. Mat 20 includes a shoulder segment 29 or a pair of shoulder segments 29 which extend beyond a width of the neck/body segment 27. As shown in FIG. 2, such shoulder segment 29 are positioned outward of the wheel wells 36. Such shoulder segments 29 cover the otherwise exposed portions 37 when mat 20 is positioned over top edge 35 of tailgate 34. In some aspects mat 20 may also have shoulders 29 which are positioned inward of wheel wells 36, however, such additional or optional shoulders make it difficult to simply slide mat 20 outward due to such additional shoulders abutting the wheel wells 36. Having a mat 20 devoid of such additional shoulders such that mat 20 is generally T-shaped provides for an improved mat 20 which is easy to slide outward and yet covers a greater amount of the top edge 35.

Figure 9:
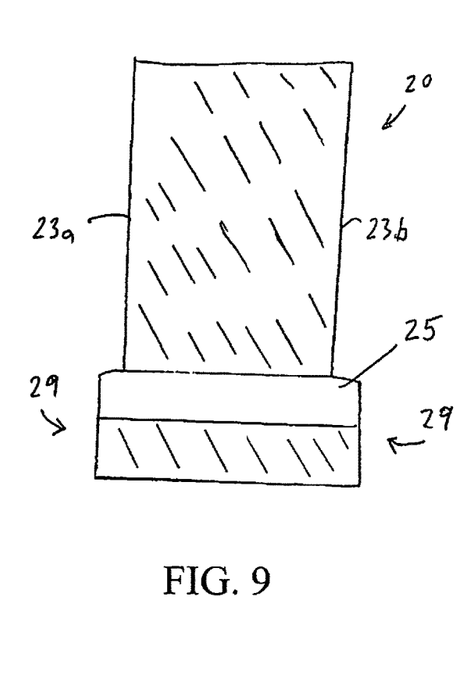
FIG. 9 is a top view of a device in accordance with a further aspect of the present invention.

FIG. 9 is a top view of a further aspect of mat 20. Mat 20 includes a band 25 extending from a first side edge 23a of mat 20 to a second side edge 23b of mat 20. More particularly, the band 25 in this aspect extends beyond the side edges 23*a*, 23*b* because the band 25 extends from edges of the shoulders 29. In one aspect, band 25 is a solid band devoid of through holes 22, and in other aspects band 25 comprises a pattern that is different compared to the remaining portions of mat 20 which may or may not include through holes 22. Band 25 may also be made of a different material or have different thickness or different flexibility characteristics compared to the rest of mat 20. In one aspect band 25 is devoid of through holes 22 so that the top edge 35 is completely covered or protected (so that a portion of a bike frame does not pass through a through hole 22 to contact top edge 35). The mat 20 in this case further eliminates or lessens any rattling noises due to transport of bicycles 40.

Figure 10:
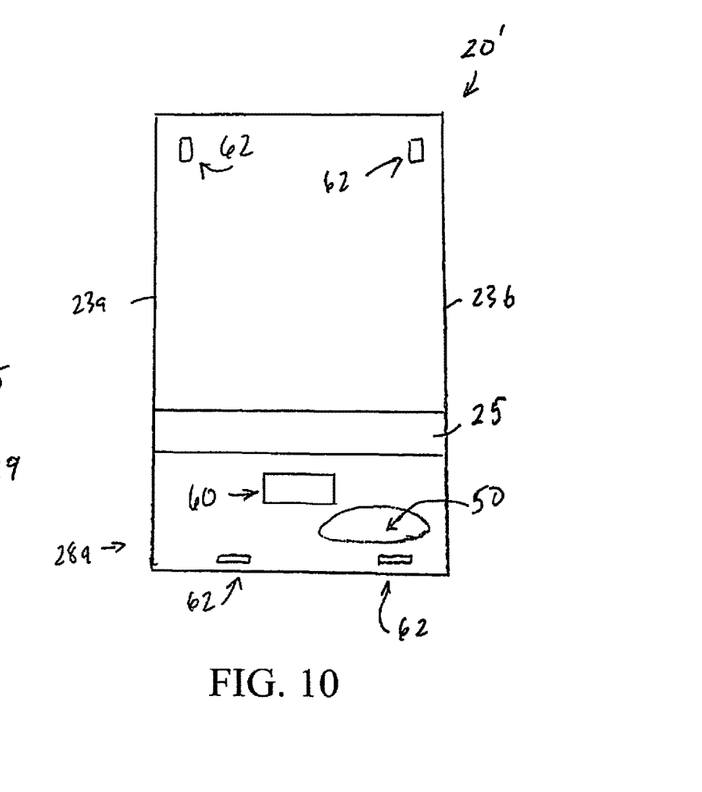
FIG. 10 is a top view of a device in accordance with a further aspect of the present invention.

FIG. 10 is a top view of a further aspect of mat 20', and includes an optional band 25 as noted above. Band 25 is positioned at an outward area of mat 20' away from back wall 33 when inserted into bed 32. Mat 20' further includes a display region 50 which may include an indicia, logo or other indicator region on segment 28*a*. Indicia contained at display region 50 operates as an optional advertisement or logo or instruction device which is made visible to rear traffic when mat 20' is positioned with segment 28*a* hanging downward from top edge 35 (See also FIG. 4). When mat 20' is returned to bed 32 liner mode, indicia or advertising device at display region 50 faces upward in the bed 30. In a further option, access region 60 is positioned at segment 28*a* so that a user may gain access to a lift handle of the tailgate 34. In alternatives, a through hole (or through holes 22) at the access region 60 are sized such that a user may access the lift handle of the tailgate 34. In alternatives, a portion of mat 20' may be selectively openable at access region 60, such as via a flap element which opens to gain access to the lift handle. Mat 20' also includes optional hand holds 62. Hand holds 62 may be through holes or other handles which allow a person to grasp mat 20' for sliding of mat 20' about bed 32 and upon top edge 35 of tailgate 34.

In further aspects, grommets may be positioned in mat 20 to receive a strap or line for pulling mat 20. In one aspect, a ring or pulley is connected to or associated with back wall 33. A strap is inserted into hand hold 62 or a grommet or a through hole 22 and lead to and around the ring or pulley associated with the back wall 33. A user may thereby pull the strap or line to draw mat 20 closer to back wall 33 to cover the exposed portion of the bed. Drawing mat 20 closer to back wall 33 also draws mat 20 away from tailgate 34 so that mat 20 can operate solely as a bed liner.

Figure 11:
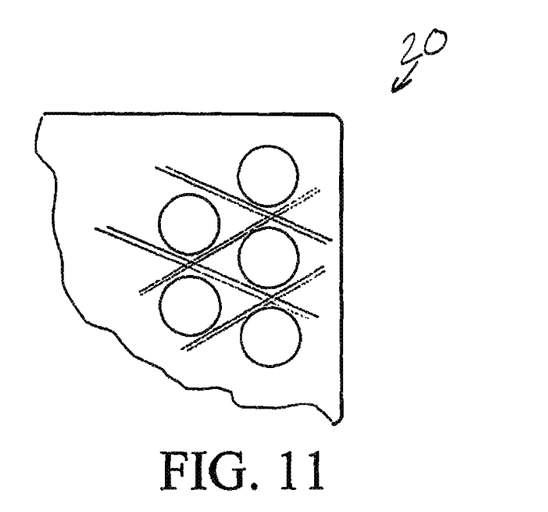
FIG. 11 is a partial bottom view of a device in accordance with a further aspect of the invention.
Figure 12:
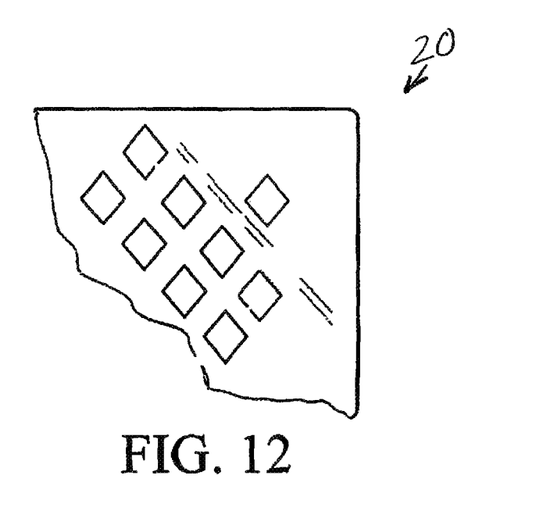
FIG. 12 is a partial bottom view of a device in accordance with a further aspect of the invention.
Figure 13:
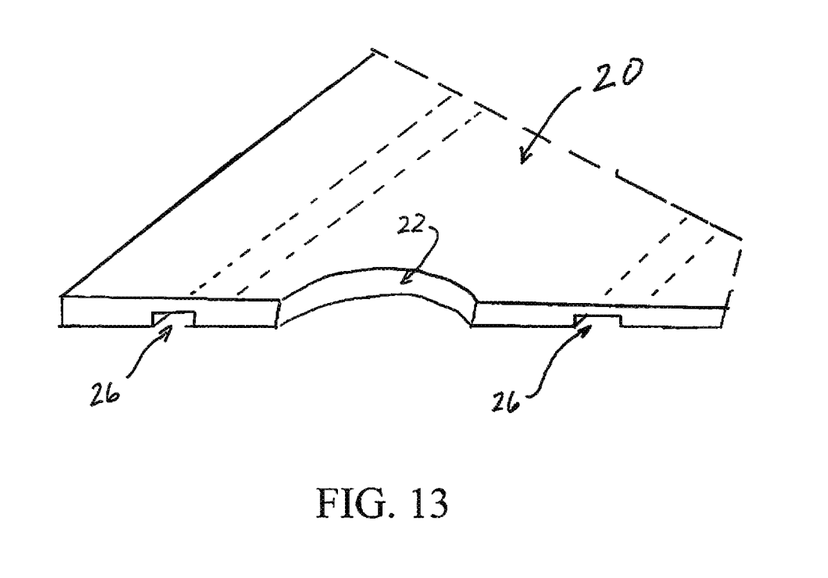
FIG. 13 is a section view of the device taken along line 13-13 of FIG. 3.
Figure 14:
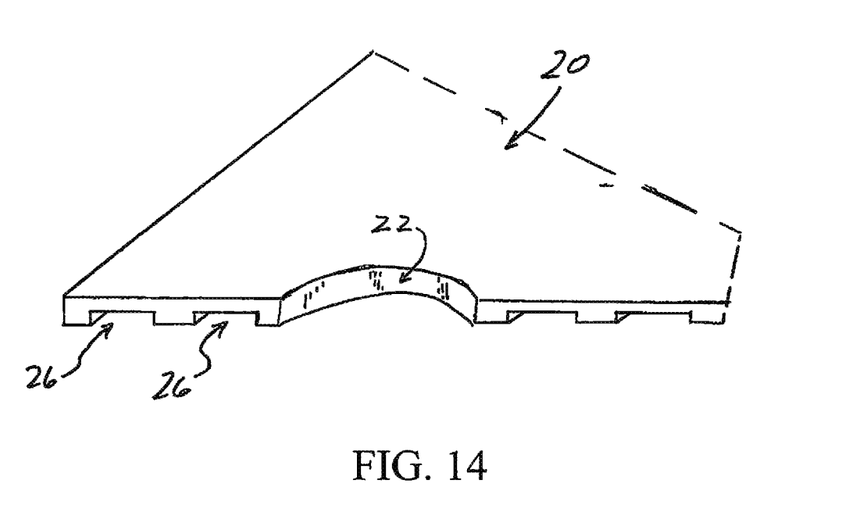
FIG. 14 is a section view of a further aspect of a device in accordance with the invention.

FIG. 11 and FIG. 12 are partial back views of an alternative mats 20 having alternative arrangements or structures of through holes 22 and drainage channels 26. Different arrangements may be utilized without departing from the scope of the invention. FIG. 13 and FIG. 14 are alternative partial section views taken along line 13-13 of FIG. 3, and depict example alternative arrangements of through holes/slots 22 and drainage channels 26.

In further aspects the invention includes a method of protecting a tailgate 34 of a pickup truck 30. In one aspect the method includes positioning at least a portion of a bed liner mat 20 over a top edge 35 of the tailgate 34 while a further portion of the bed liner mat 20 remains positioned upon the bed 32 of the truck 30. The mat 20 is configured to cover a substantial portion of the bed 32 when the mat 20 is positioned in a bed liner mode. The mat 20 is sized such that it will not fall out of the pickup bed when adjusted into a mode of protecting the top edge 35 of tailgate 34. Different sizes of mat 20 are available to match different sizes of pickup trucks. A further aspect of the method includes positioning at least one bicycle upon the pickup truck such that at least a portion of the bicycle extends over at least a portion of the bed liner mat 20 positioned over a top edge of the tailgate. In this manner a portion of the mat 20 is also positioned upon bed 32. The mat 20 is conveniently slid into position, whether over the top edge of the tailgate or resting completely on the bed 32 of the truck 30. The mat 20 may be flipped upside down as desired. Additional indicia 50 may be positioned on opposite sides of mat 20.

In further aspects mat 20 includes a portion or portions which are preformed or pre-flexed to fit over a tailgate 34 while also laying flat when in a storage mode upon bed 32. Different or selective hole patterns may be used to accomplish a pre-form or pre-flexed feature. Mat 20 may also have varying thicknesses along its length to accommodate pre-flexing and protection of tailgate 34 or other parts of truck 30. Holes 22 may be spaced closer together or further apart to achieve a desired flex or adjustment features of the mat 20. The mat 20 in some aspects is configured to fold naturally at locations to accommodate ease of placement upon tailgate 34. Some areas of mat 20 have more flexibility to accommodate a conforming orientation upon a tailgate 34.

Figure 15:
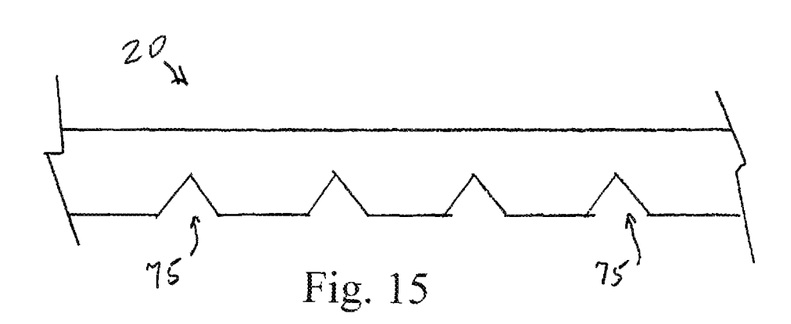
FIG. 15 is a section view of a further aspect of a device in accordance with the invention.
Figure 16:
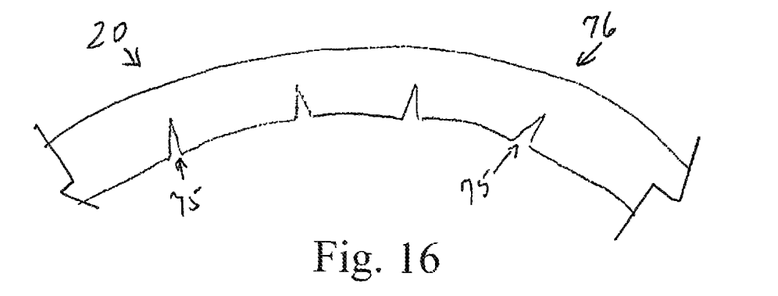
FIG. 16 is a section view of a further aspect of a device in accordance with the invention.
Figure 17:
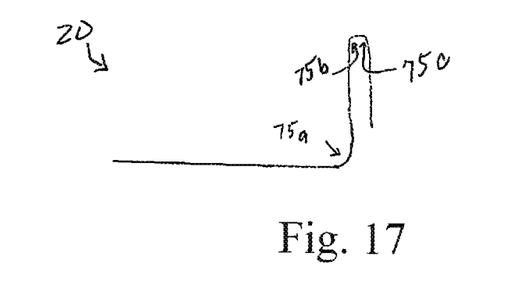
FIG. 17 is a side view of the device of FIG. 5.

FIG. 15 is a cross-section view of device 20 showing a plurality of fold-slots 75. In this aspect a fold slot is depicted as a cut-out or wedge shape structure. When mat 20 is folded about a tailgate, the mat flexes and rotates at fold slots 75 which allows for a smooth upper side 76 as shown in FIG. 16. Fold slots 75 have internal walls which may contact each other to further allow flex or easy bending of the mat so that a sharp or sharper fold radius may be achieve as is shown in FIG. 17. FIG. 17 depicts a mat which closely adheres to the surfaces of the bed and tailgate and presents a clean look without a sag which would or could otherwise appear in the areas where the mat bends, such as at or about fold area 75*a*. In one aspect mat includes a series of three sets of fold lines 75*a*, 75*b*, 75*c* to allow device 20 to obtain a sharp but smooth edge about the tailgate corners and the corner where the tailgate meets the truck bed. Fold slots 75 may comprise different configurations, including channels or lines or other grooves. In one aspect a series of fold slots 75 are grouped to accommodate a smooth curving. The fold slots 75*a* are presented at a top surface of the mat in one instance, whereas fold slots 75*b* and 75*c* are presented at a bottom surface of the mat to accommodate a desired curvature. Slots 75 in some aspects span from edge to edge of the mat, or may span partially or at portions of the mat.

The foregoing relates to exemplary embodiments of the invention and modifications may be made without departing from the spirit and scope of the invention as set forth in the following claims. The scope of this invention also includes embodiments having different combinations of features and embodiments that do not include all of the above described features.

What is claimed is:

1. A system of protecting a closed tailgate of a pickup truck, the system comprising:
   a bed of a pickup truck;
   a tailgate closing an opening to the bed; and
   a flexible mat for protecting a top edge of the tailgate, the flexible mat configured to rest upon the bed while covering the top edge of the tailgate, and having multiple through holes and defining at least one fold-slot oriented in horizontal alignment with the tailgate when the mat is positioned thereon, and where the mat includes a band devoid of through holes extending from a first side edge of the mat to a second side edge of the mat.

2. The system of claim 1 where the flexible mat has a uniform-width neck portion positioned between opposing wheel wells of the truck and extending rearward from the tailgate, and a shoulder portion having a width greater than the uniform-width of the neck portion and positioned upon the bed when the flexible mat is solely in a bed protection mode.

3. The system of claim 2 where the shoulder portion is positioned over the top edge of the tailgate when the mat is in a tailgate protection mode.

4. A method of protecting a closed tailgate of a pickup truck having a flexible bed liner mat position upon a bed of the pickup truck, the method comprising:

positioning at least a portion of the bed liner mat over a top edge of the tailgate while a further portion of the bed liner remains positioned upon the bed of the pickup truck, and where the bed liner includes multiple through holes and a solid band extending from a first side edge of the mat to a second side edge of the mat, the solid band positioned above the top edge of the tailgate.

5. The method of claim 4 further comprising positioning a bicycle upon the pickup truck wherein at least a portion of the bicycle rests upon the bed liner positioned upon the bed of the pickup truck while at least a further portion of the bicycle extends over the at least a portion of the bed liner mat positioned over the top edge of the tailgate.

6. The method of claim 4 where the bed liner is a flexible sheet containing rubber.

7. The method of claim 4 wherein the step of positioning the at least a portion of the bed liner mat over the top edge of the tailgate includes sliding the bed liner mat along at least a portion of the bed of the pickup truck and lifting the bed liner mat over the top edge of the tailgate.

8. A device for protecting a tailgate of a pickup truck, the device comprising:

a flexible mat having multiple through holes and configured to fold over a top edge of the tailgate while also positioned upon a bed of the pickup truck, the mat defining at least one fold-slot oriented in horizontal alignment with the tailgate when the mat is positioned thereon, and where the mat includes a band devoid of through holes extending from a first side edge of the mat to a second side edge of the mat.

9. The device of claim 8 where the flexible mat has a length such that the mat substantially covers a total length of the bed when the mat is positioned solely upon the bed.

10. The device of claim 8 where at least a portion of the band is positioned adjacent a wheel well of the pickup truck when the mat is positioned solely upon the bed.

11. The device of claim 8 where the band covers the top edge of the tailgate when the device is in a tailgate protection mode.

12. The device of claim 8 where the band has a width of at least 2 inches.

13. The device of claim 8 where the band has a width at least as wide as a maximum thickness of the top edge of the tailgate.

14. The device of claim 8 further comprising a drainage channel positioned between the through holes and where the mat has a neck portion positionable between opposing wheel wells of the truck, and a shoulder portion having a width greater than the neck portion.

15. The device of claim 8 where the mat includes a display region located opposite the at least one fold-slot at a segment positioned at a shoulder portion of the mat, the shoulder portion located opposite a neck portion of the mat, the shoulder portion having a width greater than the neck portion, the display region containing indicia.

\* \* \* \* \*